United States Patent
Cha

(10) Patent No.: US 11,102,451 B2
(45) Date of Patent: Aug. 24, 2021

(54) VIDEOCONFERENCING SERVER FOR PROVIDING MULTI-SCREEN VIDEOCONFERENCING BY USING A PLURALITY OF VIDEOCONFERENCING TERMINALS AND METHOD THEREFOR

(71) Applicant: UPRISM CO., LTD., Seoul (KR)

(72) Inventor: Min Soo Cha, Seoul (KR)

(73) Assignee: UPRISM CO., LTD., Seoul (KR)

( * ) Notice: Subject to any disclaimer, the term of this patent is extended or adjusted under 35 U.S.C. 154(b) by 64 days.

(21) Appl. No.: 16/082,442

(22) PCT Filed: Mar. 20, 2018

(86) PCT No.: PCT/KR2018/003202
§ 371 (c)(1),
(2) Date: Sep. 5, 2018

(87) PCT Pub. No.: WO2019/022332
PCT Pub. Date: Jan. 31, 2019

(65) Prior Publication Data
US 2021/0227175 A1    Jul. 22, 2021

(30) Foreign Application Priority Data

Jul. 24, 2017   (KR) ......................... 10-2017-0093650

(51) Int. Cl.
*H04N 7/15* (2006.01)
*H04N 5/265* (2006.01)
*H04N 7/14* (2006.01)

(52) U.S. Cl.
CPC ............ *H04N 7/152* (2013.01); *H04N 5/265* (2013.01); *H04N 7/147* (2013.01)

(58) Field of Classification Search
CPC ............ H04N 7/15; H04N 7/14; H04N 7/147; H04N 7/152; H04N 5/265; H04L 65/403; H04L 12/1813; H04M 3/56
(Continued)

(56) References Cited

U.S. PATENT DOCUMENTS

2009/0207233 A1   8/2009   Mauchly et al. .......... 348/14.09
2011/0279663 A1   11/2011  Fan et al. ........................ 348/77
(Continued)

FOREIGN PATENT DOCUMENTS

EP   2334068 A1   6/2011
EP   2541928 A1   1/2013
(Continued)

OTHER PUBLICATIONS

Indian Office Action dated Jul. 23, 2020, issued to Indian Application No. 201817032639.
(Continued)

*Primary Examiner* — Melur Ramakrishnaiah
(74) *Attorney, Agent, or Firm* — Stein IP, LLC

(57) ABSTRACT

A videoconferencing server for providing a multi-screen video conference by using multiple videoconferencing terminals and a method thereof. The video conferencing server can logically group a plurality of the existing videoconferencing terminals (physical terminals) each having one or two displays to operate like a logical terminal operating as one videoconferencing point. The video conferencing server may process as if the logical terminal supports multiple screens by transmitting videos to the plurality of physical terminals constituting the logical terminal.

14 Claims, 3 Drawing Sheets

(58) Field of Classification Search
USPC .............................. 348/14.01–14.16; 715/753
See application file for complete search history.

(56) References Cited

U.S. PATENT DOCUMENTS

| | | | |
|---|---|---|---|
| 2012/0162355 A1 | 6/2012 | Cheng et al. .............. | 348/14.08 |
| 2013/0088563 A1* | 4/2013 | Wu .......................... | H04N 7/15 |
| | | | 348/14.07 |
| 2014/0139618 A1* | 5/2014 | Ye ............................ | H04N 7/15 |
| | | | 348/14.09 |
| 2016/0173823 A1 | 6/2016 | Duckworth et al. ... | H04N 7/152 |

FOREIGN PATENT DOCUMENTS

| | | |
|---|---|---|
| JP | 08-294106 A | 11/1996 |
| KR | 10-2007-0054769 A | 6/2007 |
| KR | 10-2014-0127700 A | 11/2014 |
| KR | 10-2015-0118345 A | 10/2015 |
| KR | 10-2016-0062787 A | 6/2016 |
| KR | 10-2016-0099977 A | 8/2016 |
| KR | 10-2017-0071251 A | 6/2017 |

OTHER PUBLICATIONS

International Search Report dated Jul. 31, 2018, issued by the Korean Intellectual Property Office in corresponding application PCT/KR/2018/003202.

* cited by examiner

VIDEOCONFERENCING SERVER FOR PROVIDING MULTI-SCREEN VIDEOCONFERENCING BY USING A PLURALITY OF VIDEOCONFERENCING TERMINALS AND METHOD THEREFOR

CROSS-REFERENCE TO RELATED APPLICATIONS

This application is a national stage of International Application No. PCT/KR2018/003202, filed Mar. 20, 2018, claims the benefit of priority to Korean Application No. 10-2017-0093650, filed Jul. 24, 2017, in the Korean Intellectual Property Office, the disclosures of which are incorporated herein by reference.

TECHNICAL FIELD

The present invention relates to a multipoint videoconferencing system and, more particularly, to a videoconferencing server for providing a multi-screen video conference that displays a plurality of videos for a multipoint video conference by using a plurality of videoconferencing terminals, even without an existing telepresence, and a method therefor.

BACKGROUND ART

A videoconferencing system is generally categorized into a standard videoconferencing terminal (or system) using a standard protocol such as H.323 or Session Initiation Protocol (SIP) and a non-standard videoconferencing terminal using a developer's own protocol.

Major videoconferencing facility companies such as CISCO, POLYCOM, AVAYA, and LIFESIZE provide videoconferencing solutions using the standard protocols as mentioned above. However, since it is difficult to realize various functions in products when manufacturing the products using only the standard protocol, there are also many companies that provide non-standard videoconferencing systems.

<MCU for a Multipoint Video Conference Based on a Standard Terminal>

A videoconferencing system generally provides a 1:1 video conference in which only two videoconferencing terminals (two points) are connected, and a multipoint video conference in which multiple videoconferencing terminals (multiple points) are concurrently connected. Each of the videoconferencing terminals participating in the video conference serves as one videoconferencing point, where in general at least one conference participant attends each point.

The standard videoconferencing terminal is primarily applied to a 1:1 video conference because it processes only one video and voice by establishing a session with the other party. In addition, when using H.239 and Binary Floor Control Protocol (BFCP) at the standard terminal, it is possible to process additionally auxiliary video for a document conference. Here, the BFCP is, as a binary format standard for carrying out floor control in a conference system, a standard that is to process flow control during a collaboration session between terminals that process collaboration software.

A device called a Multipoint Conferencing Unit (MCU) is required to address the aforementioned technical limitation in a standard videoconferencing system and to perform a multipoint video conference in which three or more points are connected, rather than just a 1:1 video conference. The MCU mixes the videos provided by three or more points to create one video for each point and provides the video to the standard terminal, thereby eliminating the restriction of the standard protocol. Mixing is a relatively expensive operation.

All the videoconferencing terminals associated with the video conference compress the video and voice data they have generated and transmit the result to a counter party. Then, the MCU performs a mixing process of decoding the compressed video data to be recovered to the original video data and creating new video by rendering the recovered multiple videos according to a predetermined layout. The MCU reencodes the mixed video and provides it to each point. While the MCU or a server equipped with the MCU is a relatively expensive apparatus in the videoconferencing system, it is an important device for the multipoint video conference.

When the video is mixed, the terminal processes one video, in such a way that there is no technical difference from the case where the conference is performed at 1:1. However, the new video provided by the MCU contains the videos provided by multiple points which are combined in a form of Picture by Picture (PBP), Picture in Picture (PIP), or the like. In addition, the bandwidth required in the terminal end is not substantially different from 1:1.

<Multipoint Video Conference in a Non-Standard Videoconferencing System>

In a non-standard videoconferencing system, the video is processed without using a standard MCU, and a separate gateway is used when connection with a standard video terminal is required. Terminals at multiple points are logged in to a server to attend a specific conference room. Some non-standard products may be processed in a peer-to-peer (P2P) fashion without involving a server.

In a non-standard video conferencing system, a device that performs the MCU or a function of MCU is not used because it requires an expensive high-performance server to implement the function of the MCU. Instead of performing video mixing, it is possible to use a method by which each terminal simply relays generated videos to other participants (terminals at different points). The relay scheme has an advantage of using fewer system resources of the server than mixing, although it also has a disadvantage that the network bandwidth required for the video relay increases exponentially.

For example, assume that five persons (five points) attend the same conference room and each point sees all of the videos provided by the other points at once, a bandwidth of 25 times (5×5) is required because each point transmits its own video and receives videos from the other 4 points. Likewise, when 10 videoconferencing terminals are participating, a bandwidth of 100 times is required. As the number of participants increases, the required bandwidth increases exponentially.

<Acquiring a Token for a Document Video Conference>

While videoconferencing terminals in the related art may output the main video screen and the document video screen to two display devices at the same time, inexpensive video conferencing devices often support only a single display output. Videoconferencing terminals supporting a single display may or may not support H.239 or BFCP for document video conference.

When displaying a document video according to the H.239 or BFCP protocol in a single display, a screen is usually divided and displayed, and the terminal itself may provide various layouts for displaying two videos in various forms. In addition, the terminal may support a function of selecting and enlarging one of the main video or the document video.

As described above, the videoconferencing terminal may transmit one video and further transmit the document video using H.239 or BFCP technology. In order to transmit the document video, the presenter needs to acquire a presenter token: only one terminal (i.e., one point) among the terminals that attend the conference may have the token. Therefore, it is only the terminal acquiring the presenter token that can send the main video with the document video of the attendee to the server at the same time.

<Telepresence>

Major companies such as Cisco, Polycom, and the like provide videoconferencing equipment of ultra-expensive telepresence technology, which not only can support three or four display outputs, but also can transmit as many videos as the number of output displays supported without a presenter token. In the related industry, the multi-video transmission function for a video conference has been recognized as a unique function of the telepresence equipment.

The telepresence equipment may not be interoperable with general videoconferencing terminals, and may be interoperable with the videoconferencing terminals only through expensive gateway equipment that is provided separately. Even though the interoperation is worked out, the quality of video is very poor as compared to a call between general videoconferencing equipments. Due to these reasons, videoconferencing terminals with three display outputs are rarely available in the market because of the constraints of standard technology.

DOCUMENTS OF RELATED ART (Patent Document 1) Korean Patent Application Publication No. 10-2016-0062787 (Method of mixing multiple video feeds for video conference, and video conference terminal device, video conference server, and video conference system using the same)

DISCLOSURE

Technical Problem

Accordingly, the present invention has been made keeping in mind the above problems occurring in the prior art, and an object of the present invention is to provide a videoconferencing server for providing a multi-screen video conference for a multipoint video conference using a plurality of videoconferencing terminals and a method thereof.

As seen in the background art, a videoconferencing terminal in the related art is provided such that the number of display devices connectable is determined by the number of video output terminals of its own. General-purpose videoconferencing terminals support a maximum of two screens, while telepresence equipment supports three or more screens, but at a high price. In order to solve this problem, an aspect of the present invention is to provide a videoconferencing server for providing a multi-screen video conference without telepresence equipment in the related art, and a method thereof, because a plurality of videoconferencing terminals held at respective end points are configured as a logical terminal and thus processed as if the plurality of videoconferencing terminals operate as one videoconferencing point having multiple screens.

In addition, another aspect of the present invention is to provide a multi-screen videoconferencing server capable of transmitting a plurality of videos and outputting three or more displays without acquiring a presenter token and a method thereof, like expensive telepresence equipment transmits multiple videos.

Technical Solution

In order to accomplish the above object, a method of providing multi-screen videoconferencing service of a videoconferencing server is accomplished by a terminal registration unit, a call connection unit, a video processing unit of the server, in which at least 2 videoconferencing terminals are grouped as a logical terminal to operate like a virtual videoconferencing point, thereby providing the multi-screen videoconferencing service using the multiple display devices included in the logical terminal.

A method of the present invention includes a registration step of allowing a terminal registration unit to register at least 2 physical terminals as one logical terminal so that the at least 2 physical terminals operate like one videoconferencing point; a call connection step of allowing a call connection unit to connect to at least 2 videoconferencing points for a video conference, wherein the call connection unit connects to each of the at least 2 physical terminals constituting the logical terminal; a source video receiving step of allowing the call connection unit to receive source videos provided by the videoconferencing points, the source videos being received from each of the at least 2 physical terminals constituting the logical terminal; and a multi-screen video providing step of allowing the call connection unit to transmit the videos provided by the videoconferencing points in the source video receiving step, to the physical terminals of the logical terminal so that the logical terminal operates as one virtual videoconferencing point.

According to an embodiment, the call connection step may be processed differently from the general points when a call-originating end or a receiving end is the logical terminal. When a call-originating end of the call connection is a physical terminal belonging to the logical terminal, the call connection unit creates an individual connection with each of remaining physical terminals of the logical terminal. Further, when a receiving end of the call connection is a physical terminal belonging to the logical terminal, the call connection unit creates an individual connection with each of remaining physical terminals of the logical terminal. For the call connection, a protocol such as H.323 or SIP may be used.

According to an embodiment, the multi-screen video providing step may include a step of allowing a video processing unit to mix all source videos received in the source video receiving step into a plurality of videos that are to be transmitted to each of the physical terminals constituting the logical terminal.

For example, the video processing unit may mix m3 videos acquired by extracting m2 source videos received by the logical terminal from a total of M source videos received in the source video receiving step, into m1 videos for the multiple physical terminals, in which the m1 is the number of display devices included in the logical terminal, and m3 is expressed below:

m3=M−m2, where, M is the total number of source videos, and m2 is the number of the physical terminals constituting the logical terminal.

In this case, when one of the videoconferencing points acquires a presenter token for a document conference, the M may be a value obtained by adding one to the total number of source videos.

According to another embodiment, in the multi-screen video providing step, the video processing unit may mix each of the videos being transmitted to each of the at least 2 physical terminals together with the source video from each of the at least 2 physical terminals.

According to still another embodiment, another method of the multi-screen video providing step is possible. For example, in the multi-screen video providing step, the call connection unit sequentially may provide the videos provided by other videoconferencing points among the entire source videos received in the source video receiving step, to the logical terminal, thereby displaying the videos in an existing relay manner.

A videoconferencing server having the terminal registration unit, the video processing unit, and the call connection unit for accomplishing the above method falls within the scope of the present invention.

Advantageous Effects

As described above, the videoconferencing server of the present invention can logically group a plurality of videoconferencing terminals (physical terminals) each having a limited number of displays (usually one or two) to operate like a logical terminal operating as one videoconferencing point. The videoconferencing server may process as if the logical terminal supports multiple screens by providing videos to the plurality of physical terminals constituting the logical terminal.

In a multipoint video conference, a videoconferencing server provides videos of other videoconferencing points according to the number of screens, i.e., the number of display devices, included in the logical terminal, thereby producing advantageous effects that the physical terminals included in the logical terminal have a fewer number of other videoconferencing points that are to be displayed as compared to the related art, and thus the complexity of the video displayed on one screen is also lowered. Since the complexity of the video is lowered, there is an advantage that the quality of video is improved even in a physical terminal having low performance and a network having a low speed.

Since the logical terminal according to the present invention is implemented through the internal processing of the videoconferencing server and there is no direct connection between the physical terminals, even if the physical terminals have a video codec or a system performance different from each other or are from different manufacturers, there is no problem in grouping the physical terminals into the logical terminal. Of course, since multiple screens are provided through the logical terminal, there is no need to upgrade the system resource of each videoconferencing terminal for supporting multiple screens.

MODE FOR INVENTION

Hereinafter, the present invention will be described in detail with reference to the drawings.

Figure 1:
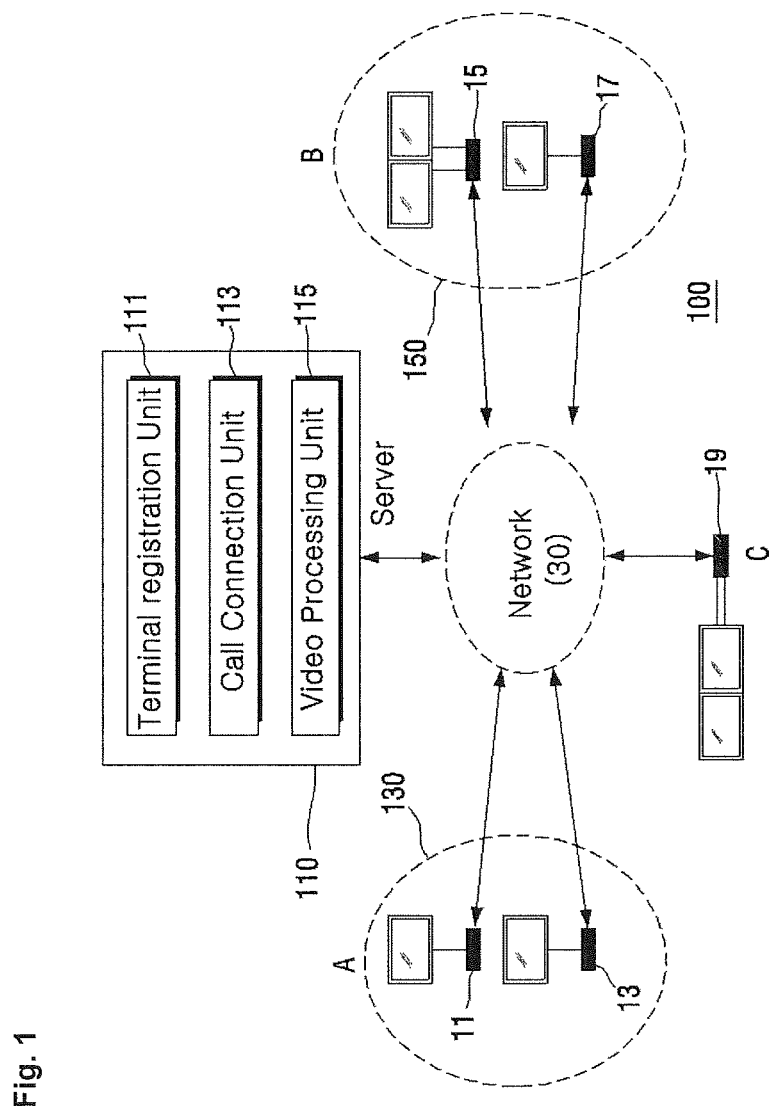
FIG. 1 is a configuration diagram of a videoconferencing system according to an embodiment of the present invention.

Referring to FIG. 1, the videoconferencing system 100 according to the present invention is such that a server 110 and a plurality of videoconferencing terminals are connected through a network 30. The videoconferencing system 100 supports a 1:1 video conference in which two points are connected and a multipoint video conference in which three or more points are connected. The videoconferencing terminals 11, 13, 15, 17, and 19 shown in FIG. 1 are shown as examples of terminals capable of being connected.

The network 30 connected between the server 110 and the videoconferencing terminals 11, 13, 15, 17, and 19 is an IP network and may include a heterogeneous network connected through a gateway or may be connected to the heterogeneous network. For example, a wireless telephone using a mobile communication network may also be a videoconferencing terminal of the present invention, in which the network 30 includes a mobile communication network connected through a gateway and capable of processing an IP packet.

The server 110 generally controls the videoconferencing system 100 of the present invention and includes a terminal registration unit 111, a call connection unit 113, and a video processing unit 115 in addition to a function of typical videoconferencing processing server in the related art.

The terminal registration unit 111 performs registration, setting, and management of a physical terminal and a logical terminal described below, and the call connection unit 113 controls a call connection in the video conference of the present invention. The video processing unit 115 implements multiple screens such as telepresence by processing (mixing, decoding, encoding, etc.) a video provided between the physical terminals and/or the logical terminals when the videoconferencing call is connected. The detailed operation of the terminal registration unit 111, the call connection unit 113, and the video processing unit 115 will be described in detail later with reference to FIG. 3.

All videoconferencing terminals 11, 13, 15, 17, and 19 included in the videoconferencing system 100 support a standard protocol related to a video conference. However, the terminals are videoconferencing terminals to which one display device may be connected or two display devices may be connected for document conference, rather than terminals capable of providing the telepresence service described in the related art. The standard protocol includes H.323, SIP or the like.

In addition, each of the videoconferencing terminals 11, 13, 15, 17, and 19 is a videoconferencing terminal equipped with a video/audio codec in the related art. Of course, terminals that supports document conference among the videoconferencing terminals 11, 13, 15, 17, and 19 use H.239 and BFCP.

The videoconferencing terminals connected to the videoconferencing system of the present invention may constitute a 'logical terminal'. The logical terminal is a logical combination of a plurality of videoconferencing terminals. Herein, the logical terminal may be constituted of two videoconferencing terminals or three or more videoconferencing terminals, but the plurality of videoconferencing terminals constituting the logical terminal are not directly connected to each other. Each of the videoconferencing terminals typically operates as one videoconferencing point, while the logical terminal is configured such that the videoconferencing terminals operate as one videoconferencing point. In other words, the logical terminal has as many display devices as are equipped in physical terminals that are constituent terminals thereof. If necessary, the logical terminal may designate one of the plurality of constituent terminals as the representative terminal.

Hereinafter, the typical videoconferencing terminal in the related art is referred to as a 'physical terminal' in order to distinguish the logical terminal from the videoconferencing terminal in the related art. The logical terminal has the plurality of physical terminals logically connected. No matter how many physical terminals the logical terminal includes, the logical terminal is treated as a connection point within the video conference.

For example, FIG. 1 shows multipoint videoconferencing systems having three connection points A, B, and C having two logical terminals 130 and 150 and one physical terminal 19 mutually connected by a server 110. The first logical terminal 130 corresponding to the first point A is constituted of first and second physical terminals 11 and 13 each having one display device, and the second logical terminal 150 corresponding to the second point B is constituted of a third physical terminal 15 having two display devices and a fourth physical terminal 17 having one display device.

Since the logical terminal is a logical configuration managed by the server 110 and the standard protocol supports only 1:1 connection, the connection between the server 110 and the logical terminal means that all the physical terminals constituting the logical terminal and the server 110 are individually connected according to standard protocol. For example, according to the SIP protocol, FIG. 1 shows that five physical terminals 11, 13, 15, 17, and 19 establish five SIP sessions with the server 110, regardless of the configuration of the logical terminal.

The server 110 in the videoconferencing system according to the present invention supports the following connections.

(1) A Video Conference in which One Physical Terminal is Connected to One Logical Terminal For example, it is the case that the fifth physical terminal 19 calls the first logical terminal 130 in FIG. 1. The server 110 concurrently or sequentially calls the first and second physical terminals 11 and 13 constituting the first logical terminal 130 and connects the fifth physical terminal 19 thereto.

(2) A Video Conference in which One Logical Terminal Calls One Physical Terminal For example, it is the case that the first physical terminal 11 that is a representative terminal of the first logical terminal 130 calls the fifth physical terminal 19. The server 110 concurrently or sequentially calls the second physical terminal 13 that is another physical terminal constituting the first logical terminal 130, and the fifth physical terminal 19 that is receiving end and connects the first physical terminal 11 thereto.

(3) A Video Call in which One Logical Terminal Calls Another Logical Terminal

For example, it is the case that the first logical terminal 130 calls the second logical terminal 150 in FIG. 1. When a user calls the second logical terminal 150 using the representative terminal 11 of the first logical terminal 130, the server 110 concurrently or sequentially calls two physical terminals 15 and 17 constituting the second logical terminal 150, also calls the second physical terminal 13 that is a remaining terminal other than the representative terminal 11 on the call-originating end, and connects the representative terminal 11 thereto.

(4) Multipoint Video Conference

As shown in FIG. 1, the videoconferencing system of the present invention supports a connection of three or more points in which a logical terminal is connected as a point. One logical terminal and two physical terminals may be connected, two or more logical terminals and one physical terminal may be connected, or two or more logical terminals may be connected to each other. The connection between multiple points may be performed in a manner known in the related art. However, when the newly participating point is a logical terminal, all the physical terminals constituting the logical terminal need to be connected.

<Supporting Multiple Screens>

The videoconferencing system 100 of the present invention may provide multiple screens such as a telepresence using a logical terminal system. The logical terminal is a virtual terminal, which may be equipped with as many screens as are provided by all the plurality of physical terminals constituting the logical terminal.

The server 110 reconfigures multipoint videoconferencing videos in such a manner as to match the number of display devices that are included in each logical terminal (m1, the number of videos that the server has to provide to each logical terminal) with the total number of physical terminals that are included in the points connected in the video conference (M, the number of source videos), whereby m3 videos are reedited into m1 videos and then provided to the logical terminal. Herein, m3 is the number of source videos that the logical terminal is to display for the video conference, and is indicated as Equation 1 below.

$$m3 = M - m2 \qquad \text{[Equation 1]}$$

Where, m2 is the number of physical terminals constituting each of the logical terminals.

On the other hand, each physical terminal may set or request so that its own video (source video) is displayed. In this case, when m3 videos are reedited into m1 videos for each logical terminal and provided to each of the physical terminals constituting the logical terminal, the source video provided by the corresponding physical terminal may be mixed and provided together.

As long as m3 is not the same value as m1, the server 110 requires a process of mixing the source video. However, according to another embodiment, m3 videos may be sequentially provided at a regular time interval without reediting m3 videos into m1 videos for the logical terminal. For example, when m3=3 and m1=1, three source videos may be sequentially provided without reediting the three source videos through mixing or the like. In this case, it is possible to process video conference in a relay manner, which was impossible with the standard videoconferencing terminal in the related art.

On the other hand, once any physical terminal participating in the video conference according to the present invention has acquired a presenter token, whether or not the logical terminal is configured, the terminal can provide two source videos. For example, according to the acquisition of the presenter token, the first physical device 11 may provide the server 110 with the video for document conference together with the main video. In this case, M is a value obtained by adding one to the total number of the physical terminals included in the points connected for the video conference.

Figure 2:
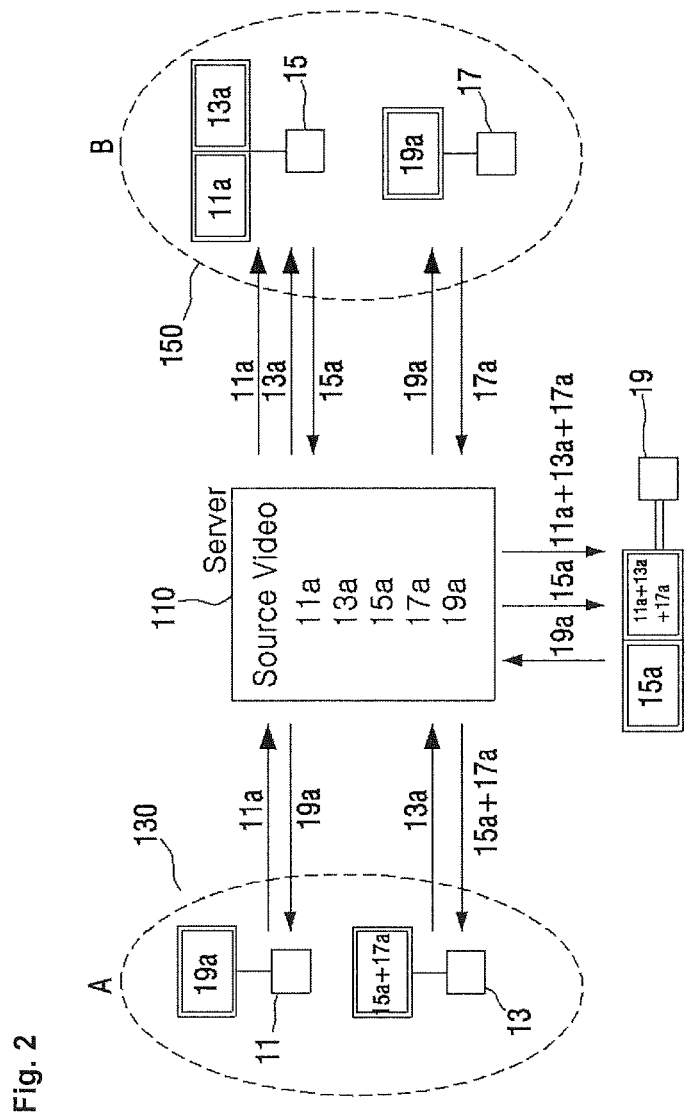
FIG. 2 is a connection diagram of a multi-video conference in which all the three points as depicted in FIG. 1 participate.

FIG. 2 is a connection diagram of a multipoint video conference in which all the three points as depicted in FIG. 1 participate, in which the first logical terminal 130, the second logical terminal 150, and the fifth physical terminal 19 are interconnected to create a multipoint video conference between the 3 points. Referring to FIG. 2, the number of the physical terminals 11, 13, 15, 17, and 19 included in the video conference is five (M=5). That is, since five source videos 11a, 13a, 15a, 17a and 19a are provided by the five physical terminals 11, 13, 15, 17 and 19 to the server 110, the server 110 reedits the five source videos according to the number m1 of the display devices provided in each of the points and provides the reedited videos to each point.

Since the first logical terminal 130 has two display devices, i.e., the first physical terminal 11 and the second physical terminal 13, here m1=2 and m2=2. In the multipoint video conference between the three points, since the physical terminals connected to the first logical terminal 130 for the video conference are the third to fifth physical terminals 15, 17, and 19, making the number thereof three (m3, 3=5-2), the three source videos provided by the three physical terminals are to be reedited into two videos. It is thus possible to separately determine which source video is to be displayed on which screen (or terminal). In FIG. 2, the first physical terminal 11 displays the source video of the fifth physical terminal 19, and the second physical terminal 13 displays a video acquired via mixing of the source videos of the third physical terminal 15 and the fourth physical terminal 17.

The second logical terminal 150 includes three display devices because the third physical terminal 15 has two display devices and the fourth physical terminal 17 has one display device, thereby making m1=3 and m2=2. Thus, the server 110 allows the source videos provided by the three physical terminals to be displayed as three videos for the second logical terminal 150. Since the number of source videos to be displayed coincides with the number of screens, they may be displayed one to one. It is thus possible to separately determine which source video is to be displayed on which screen. In FIG. 2, both the source videos, the first and second physical terminals 11 and 13, are displayed in the third physical terminal 15, while the source video provided by the fifth physical terminal 19 is displayed in the fourth physical terminal 17.

Equation 1 is also applied to the fifth physical terminal 19. Since m1=2 and m2=1 in the fifth physical terminal 19, the server 110 reedits the four source videos (m3=5-1) into two (m1) videos and then provides the resulting videos to the fifth physical terminal 19. Since the fifth physical terminal 19 is to display the source videos provided by the total of four physical terminals 11, 13, 15, and 17 of the first logical terminal 130 and the second logical terminal 150 using the two display devices, the fifth physical terminal 19 is configured such that the four source videos are suitably edited and displayed as two videos.

When the third physical terminal 15 constituting the second logical terminal 150 acquires the presenter token, the physical terminal 15 may provide two source videos. In this case, the second logical terminal 150 provides a total of three source videos, and thus M becomes six. The number of source videos to be processed by the server 110 and transmitted to the first logical terminal 130, the second logical terminal 150, and the fifth physical terminal 19 is one more than that described above.

Figure 3:
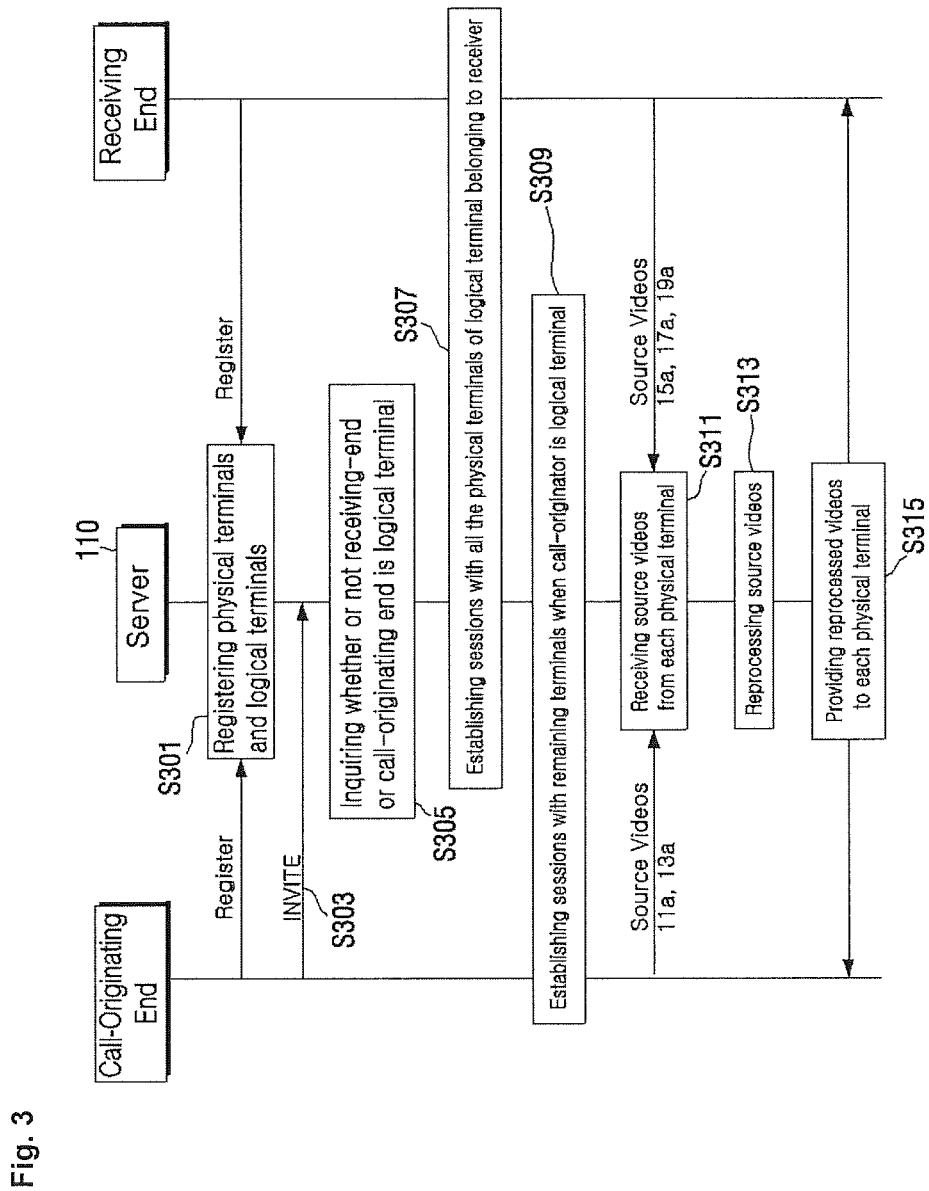
FIG. 3 is a flowchart illustrating a method of providing a multi-screen videoconferencing service of a videoconferencing server according to the present invention.

Hereinafter, a method of providing a multi-screen videoconferencing service of the server 110 will be described with reference to FIG. 3. For the convenience of description, it will be described with a focus on a procedure of connecting the call in such a manner that the first physical terminal 11 of the first logical terminal 130 becomes a call-originating end and the second logical terminal 150 becomes a receiving end. First, a step of registering the logical terminal is to be performed.

<Registration Step of Logical Terminal: S301>

The terminal registration unit 111 of the server 110 proceeds and manages to register the physical terminals and the logical terminals. The registration of the physical terminals needs to be performed prior to or simultaneously with the registration of the logical terminals, and the IP address of each physical terminal is indispensably required for the registration of each physical terminal.

The physical terminals may be registered via various methods known in the related art. For example, the registration of the physical terminals may be performed using a location registration process through a registration command on the SIP protocol. In this case, the telephone number, etc. of the physical terminal may be registered. When the location of the physical terminal is registered, the server 110 may confirm whether or not the physical terminal is currently turned on and operated.

The registration of a logical terminal specifies physical terminals included in the corresponding logical terminal, in which the number of display devices connected to each physical terminal is registered. According to embodiments, it is possible to set the layout (or relative position) between the display devices included in the logical terminal, the video mixing method (including the relay method) according to the number m3 of the source videos, or the layout of the mixed videos. For example, the terminal registration unit 111 registers configuration information configuring the first physical terminal 11 and the second physical terminal 13 as the first logical terminal 130, and manages the configuration information. The registration of the logical terminal may be performed using a web page provided by the terminal registration unit 111 or a separate terminal accessing to the terminal registration unit 111.

<Originating Call-Connection Step for a Video Conference: S303>

When the call connection unit 113 of the server 110 receives a request for the call connection from one point, a call setup of the video conference between videoconferencing points is initiated. In the case of a SIP protocol, the call connection unit 113 receives a SIP signaling message INVITE. In the example of FIG. 2, since the first physical terminal 11 of the first logical terminal 130 calls the third physical terminal 15 of the second logical terminal 150, the call connection unit 113 receives an INVITE message by which the first physical terminal 11 that is the call-originating end calls the third physical terminal 15 with the telephone number or IP address of the third physical terminal 15.

<Inquiring Whether or not an Originator and/or a Receiver is a Logical Terminal: S305>

The call connection unit 113 of the server 110 inquires the terminal registration unit 111 about whether or not the receiving-end telephone number is a telephone number (or an IP address) of one of the physical terminals constituting a logical terminal. Similarly, the call connection unit 113 inquires the terminal registration unit 111 about whether or not the call-originating end is the telephone number (or IP address) of one of the physical terminals constituting a logical terminal. Accordingly, the call connection unit 113 confirms whether or not the corresponding call connection is a connection to a logical terminal.

According to embodiments, when a receiving end is a physical terminal constituting a logical terminal, the call connection unit 113 additionally confirms whether or not the physical terminal is a representative terminal of the logical terminal. In this case, when the physical terminal is not receiving-end representative terminal, the receiving end may not be treated as a logical terminal. Similarly, in the case of a call-originating end, by additionally confirming as to whether or not the physical terminal is a representative terminal of the logical terminal, when the physical terminal is not the call-originating-end representative terminal, the call-originating end may not be treated as a logical terminal.

<Connecting a Video Conference: S307, S309>

When the receiving-end telephone number is for a logical terminal, the call connection unit 113 performs a procedure of establishing SIP sessions with all the physical terminals belonging to the receiving-end logical terminal. In the example of FIG. 2, since the receiving end is the second logical terminal 150, the call connection unit 113 establishes 2 SIP sessions with the second physical terminal 15 and the fourth physical terminal 17 respectively. At this time, the call connection unit 113 may simultaneously or sequentially transmit the INVITE message to the third physical terminal 15 and the fourth physical terminal 17 (S307).

In the example of FIG. 2, since the call-originating end is also the logical terminal, the call connection unit 113 also establishes a SIP session with the second physical terminal 13 of the first logical terminal 130. In the example of FIG. 2, the call connection unit 113 also may create a SIP session with the fifth physical terminal 19 to allow the fifth physical terminal 19 to participate in the video conference (S309).

All the physical terminals on the receiving end and/or the call-originating end that have received the INVITE message perform negotiation to select the video and audio codec or the like through Session Description Protocol (SDP) information. When the negotiation is successfully completed, an actual session is established and therefore the call is connected.

<Step of Receiving Source Videos from Each Single Physical Terminal: S311>

As described above, since a call connection with the logical terminal actually refers to a connection with the individual physical terminals constituting the logical terminal, a plurality of sessions are established. The physical terminals constituting the logical terminal also individually generate source videos and transmit the videos to the server 110. Accordingly, in the case of FIG. 2, the call connection unit 113 receives the five source videos 11a, 13a, 15a, 17a, and 19a provided by the five physical terminals 11, 13, 15, 17, and 19 that are established via sessions.

<Reprocessing Source Videos of a Server: S313>

The video processing unit 115 of the server 110 decodes, mixes, and then encodes the source videos in order to render the source video received from the physical terminal into the video for each point. In other words, the video processing unit 115 may reedit m3 videos into m1 videos for each logical terminal.

The video processing unit 115 performs mixing on the source video according to a predetermined layout for each logical terminal or physical terminal or according to a layout requested by each terminal.

As described above, the call connection unit 113 may sequentially provide the source videos at a predetermined time interval without processing in the video processing unit 115, to allow the source videos to be displayed in a relay format. In this case, the source videos may be transmitted as they are, without being undergone any process such as mixing. It is sufficient to change a video format of the source videos or perform transcoding when it is necessary to match them with the video codec of the terminal.

<Transmitting encoded video data to each physical terminal: S315>

The call connection unit 113 transmits videos processed by the video processing unit 115 to each of the physical terminals 11, 13, 15, 17, and 19 that are participating in the video conference. As a result, each point participating in the video conference may be provided with service such as a multi-screen telepresence.

The multiple screens used in the video conference of the videoconferencing system 100 of the present invention are processed by the above method.

Embodiment

When registering a logical terminal, the terminal registration unit 111 may generate and register a virtual telephone number for the logical terminal. In this case, the receiving end may be treated as the logical terminal only when the receiving-end telephone number is a virtual telephone number of the logical terminal in step S305.

While the present invention has been particularly shown and described with reference to exemplary embodiments thereof, it is clearly understood that the same is by way of illustration and is an example only and is not to be construed as limiting the scope of the invention as defined by the appended claims. It will be understood by those skilled in the art that various changes in form and details may be made therein without departing from the spirit and scope of the invention.

The invention claimed is:

1. A method of providing a multi-screen videoconferencing service of a videoconferencing server, the method comprising:
    a registration step of allowing a terminal registration unit to register at least 2 physical terminals as one logical terminal so that the at least 2 physical terminals operate like one videoconferencing point;
    a call connection step of allowing a call connection unit to connect to at least 2 videoconferencing points for a video conference, wherein the call connection unit connects to each of the at least 2 physical terminals constituting the logical terminal;
    a source video receiving step of allowing the call connection unit to receive source videos provided by the videoconferencing points, the source videos being received from each of the at least 2 physical terminals constituting the logical terminal; and
    a multi-screen video providing step of allowing the call connection unit to transmit the videos provided by the videoconferencing points in the source video receiving step to the physical terminals of the logical terminal so that the logical terminal operates as one virtual videoconferencing point.

2. The method according to claim 1, wherein the call connection step includes:
    when a call-originating end of the call connection is a physical terminal belonging to the logical terminal, a step of allowing the call connection unit to create an individual connection with each of remaining physical terminals of the logical terminal; or
    when a receiving end of the call connection is a physical terminal belonging to the logical terminal, a step of allowing the call connection unit to create an individual connection with each of remaining physical terminals of the logical terminal.

3. The method according to claim 1, wherein the multi-screen video providing step includes:
    a step of allowing a video processing unit to mix all source videos received in the source video receiving step into a plurality of videos that are to be transmitted to each of the physical terminals constituting the logical terminal.

4. The method according to claim 3, wherein the video processing unit mixes m3 videos acquired by extracting m2 source videos received by the logical terminal from a total of M source videos received in the source video receiving step, into m1 videos for the physical terminals constituting the logical terminal, in which the m1 is the number of display devices included in the logical terminal, and $$m3 = M - m2$$

where, M is the total number of source videos, and m2 is the number of the physical terminals constituting the logical terminal.

5. The method according to claim 3, wherein, when one of the videoconferencing points acquires a presenter token for a document conference, wherein the video processing unit mixes m3 videos acquired by extracting m2 source videos received by the logical terminal from a total of M source videos received in the source video receiving step, into m1 videos for the physical terminals constituting the logical terminal, in which the m1 is the number of display devices included in the logical terminal, and $$m3 = M + 1 - m2$$

where, M is the total number of source videos, and m2 is the number of the physical terminals constituting the logical terminal.

6. The method according to claim 3, wherein in the multi-screen video providing step, the video processing unit mixes each of the videos being transmitted to each of the at least 2 physical terminals together with the source video from each of the at least 2 physical terminals.

7. The method according to claim 1, wherein in the multi-screen video providing step, the call connection unit sequentially provides the videos provided by other videoconferencing points among the entire source videos received in the source video receiving step, to the logical terminal.

8. A videoconferencing server for providing a multi-screen videoconferencing service, the server comprising:

a terminal registration unit configured for registering at least 2 physical terminals as one logical terminal that operates like one videoconferencing point;

a call connection unit configured for connecting a call for a video conference with at least 2 videoconferencing points to receive source videos provided by the at least 2 videoconferencing points, each of the physical terminals constituting the logical terminal being connected to the call connection unit so that the source videos are received from each of the at least 2 physical terminals constituting the logical terminal; and a video processing unit configured for generating a plurality of videos that are to be provided to the at least 2 videoconferencing points using the source videos received by the call connection unit, wherein the call connection unit is configured to transmit videos that are to be provided to the at least 2 physical terminals of the logical terminal so that the logical terminal operates as one virtual videoconferencing point.

9. The sever according to claim 8, wherein the call connection unit is configured to:

create an individual connection with each of remaining physical terminals of the logical terminal when a call-originating end of the call connection is a physical terminal belonging to the logical terminal; and create an individual connection with each of remaining physical terminals of the logical terminal when a receiving end of the call connection is a physical terminal belonging to the logical terminal.

10. The server according to claim 8, wherein the video processing unit mixes all source videos received from the at least 2 videoconferencing points into a plurality of videos that are to be transmitted to each of the physical terminals constituting the logical terminal.

11. The server according to claim 10, wherein the video processing unit mixes m3 videos acquired by extracting m2 source videos received by the logical terminal from a total of M source videos received from the at least 2 videoconferencing points, into m1 videos for the at least 2 physical terminals, in which the m1 is the number of display devices included in the logical terminal, and $$m3 = M - m2$$

where, M is the total number of source videos, and m2 is the number of the physical terminals constituting the logical terminal.

12. The server according to claim 10, wherein, when one of the videoconferencing points acquires a presenter token for a document conference, wherein the video processing unit mixes m3 videos acquired by extracting m2 source videos received by the logical terminal from a total of M source videos received from the at least 2 videoconferencing points, into m1 videos for the at least 2 physical terminals, in which the m1 is the number of display devices included in the logical terminal, and $$m3 = M + 1 - m2$$

where, M is the total number of source videos, and m2 is the number of the physical terminals constituting the logical terminal.

13. The server according to claim 10, wherein the video processing unit is configured to mix each of the videos being distributed to each of the at least 2 physical terminals together with the source video from each of the at least 2 physical terminals itself.

14. The server according to claim 8, wherein the call connection unit is configured to sequentially provide the videos provided by other videoconferencing points among all source videos to the logical terminal.

* * * * *